UNITED STATES PATENT OFFICE.

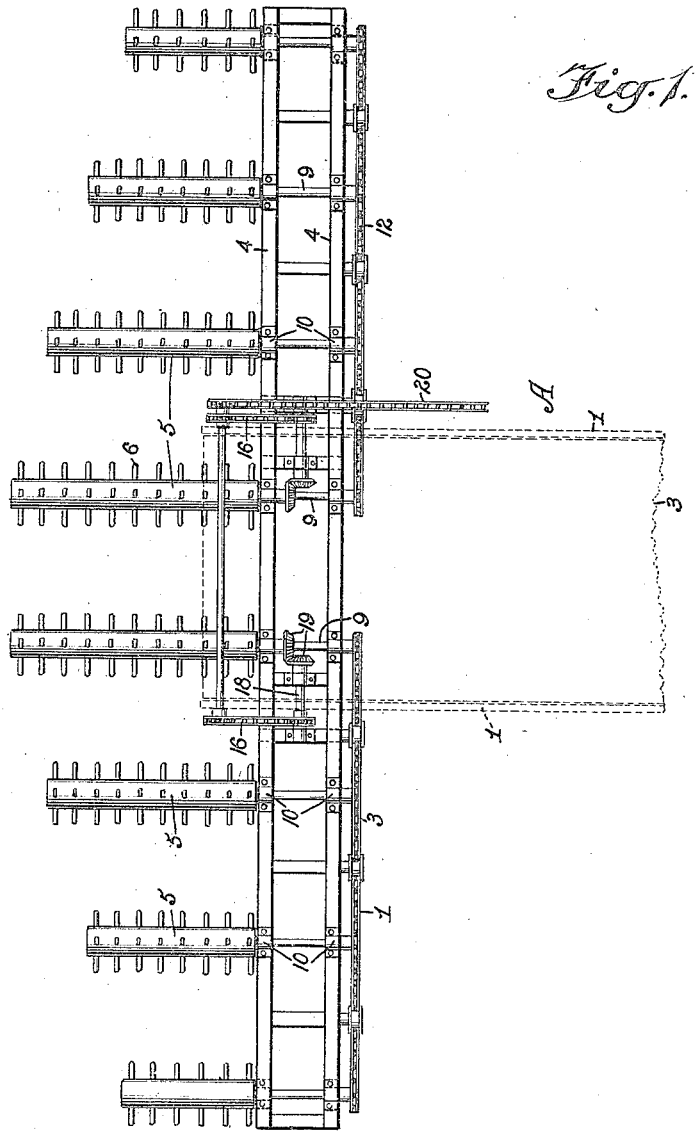

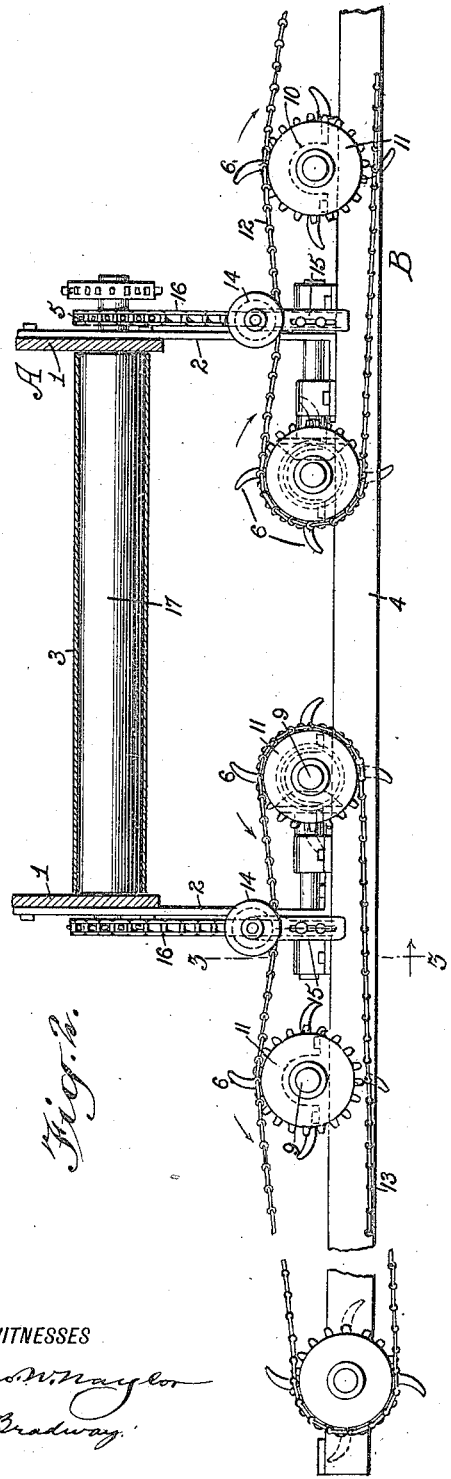

GILBERT CHAMBERLAIN MICHAEL, OF DAVENPORT, WASHINGTON.

STRAW-DISTRIBUTING ATTACHMENT FOR HARVESTERS.

1,255,769.  Specification of Letters Patent.  Patented Feb. 5, 1918.

Application filed May 9, 1917. Serial No. 167,506.

*To all whom it may concern:*

Be it known that I, GILBERT C. MICHAEL, a citizen of the United States, and a resident of Davenport, in the county of Lincoln and State of Washington, have invented a new and Improved Straw-Distributing Attachment for Harvesters, of which the following is a full, clear, and exact description.

This invention relates to combined harvesters and has to deal more particularly with a distributer for distributing the straw over the ground.

Harvesters in common use deliver the straw on the ground in a heavy layer along the wake of the machine, and it is customary to burn the straw as it is deposited too thick to plow under.

The general object of the present invention is to provide a distributer of comparatively simple and inexpensive construction and reliable and automatic in operation, so as to evenly distribute the straw over a wide area of ground so that the straw can be readily plowed under, the distributer being in the form of an attachment which is applied to the rear of a harvester so as to be operated therefrom.

A more specific object of the invention is the provision of a straw distributer which extends transversely of and is attached to the rear of the harvester, and it embodies a novel arrangement of toothed cylinders or equivalent elements which convey the straw in opposite directions laterally while allowing part of the straw to drop through, so that there will be an even distribution of the straw on the ground.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a plan view of the straw distributing attachment;

Fig. 2 is a transverse section of the rear portion of a harvester with the attachment applied thereto;

Fig. 3 is a detail sectional view on the line 3—3, Fig. 2; and

Fig. 4 is a perspective view of one of the toothed conveyers.

Referring to the drawing, A designates the rear portion of a combined harvester, which embodies frame members 1 on which are hangers 2 that carry a straw distributer B. The straw is delivered by the endless conveyer 3 from the rear of the machine and drops on the distributer B which divides the mass and carries the straw laterally in opposite directions, so that it will be distributed over a wide stretch of ground as the harvester travels.

The distributer A comprises a pair of sill members or beams 4 extending transversely to the harvester, these beams being suitably connected together to form a frame which is mounted on the hangers 2. On the frame of the attachment are two sets of horizontally disposed conveyers 5, the sets being arranged respectively at opposite sides of the center line. These elements 5 may be cylinders provided with teeth 6, as shown in Figs. 1 and 2, or they may be square or polygonal pieces of timber 7 having strips of teeth 8 fastened thereto, as shown in Fig. 4. Each toothed element 5 has a shaft 9 which rotates in bearings 10 on the sill members. The forward ends of the shafts 9 are provided with sprocket wheels 11, and all the sprocket wheels of the toothed elements at the right are connected together by a sprocket chain 12, and the sprocket wheels of the set to the left are connected by a sprocket chain 13. The toothed elements to the right move in a clockwise direction, Fig. 2, and those to the left move in an anti-clockwise direction. Between adjacent sprocket wheels belt tighteners composed of pulleys 14 adjustably mounted on the frame members by brackets 15 may be employed. The toothed elements are progressively shortened from the center outwardly, as clearly shown in Fig. 1, and this, together with the fact that the toothed elements are properly spaced apart and have teeth of the proper design, insures an even distribution of the straw over the ground. The straw is delivered from the conveyer 3 of the harvester so that it will drop on the innermost toothed elements, some of it passing between them to the ground directly, and the rest of the straw mass is divided, some of it being carried to the right and some to the left, and in its transit some of the straw drops between the toothed elements or off the rear ends thereof, whereby there is a more or less uniform distribution of the straw.

The toothed elements or conveyers 5 can be driven in any suitable manner, as, for instance, by means of a sprocket and chain mechanism 16 that is connected with the rear roll 17 for the conveyer 3 of the harvesting machine A, and these sprocket mechanisms 16 drive countershafts 18 which are connected by bevel gears 19 with the shafts 9 of the innermost conveyers 5. The roll 17 for the conveyer 3 is driven from the usual sprocket chain 20 or its equivalent.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A distributer of the class described comprising a supporting structure, a plurality of spaced independently mounted parallel toothed elements, and means for connecting the elements to turn all in the same direction, said elements being of successively diminishing length in the direction in which the material is conveyed by the elements.

2. A material distributing device comprising a supporting structure, two sets of toothed elements spaced apart on the structure and grouped at opposite sides of the center thereof, the toothed elements at one side rotating in a clockwise direction and the other in an anti-clockwise direction, whereby the material is conveyed laterally and distributed on the ground, said toothed elements decreasing successively in length from the center outwardly.

GILBERT CHAMBERLAIN MICHAEL.

Copies of this patent may be obtained for five cents each, by addressing the "Commissioner of Patents. Washington, D. C."